United States Patent [19]

Zaoralek

[11] Patent Number: 5,151,576
[45] Date of Patent: Sep. 29, 1992

[54] ROLL HAVING HEATING MEANS

[75] Inventor: Heinz-Michael Zaoralek, Königsbronn, Fed. Rep. of Germany

[73] Assignee: Schwabische Huttenwerke GmbH, Aalen-Wasseralfingen, Fed. Rep. of Germany

[21] Appl. No.: 741,906

[22] Filed: Aug. 8, 1991

[30] Foreign Application Priority Data

Aug. 9, 1990 [DE] Fed. Rep. of Germany ....... 4024274
Oct. 25, 1990 [DE] Fed. Rep. of Germany ....... 4033986

[51] Int. Cl.⁵ .......................... D06F 67/02; D21F 5/16
[52] U.S. Cl. .................................... 219/469; 219/470
[58] Field of Search ............... 219/469, 470, 471, 216

[56] References Cited

U.S. PATENT DOCUMENTS

| | | | |
|---|---|---|---|
| 2,700,094 | 1/1955 | Hosack | 219/469 |
| 2,739,218 | 3/1956 | Wennerlund | 219/469 |
| 2,834,860 | 5/1958 | Claiborne | 219/469 |
| 3,020,383 | 2/1962 | Onishi | 219/470 |
| 3,105,133 | 9/1963 | Norton | 219/469 |
| 4,158,128 | 6/1979 | Endokimov | 219/469 |
| 4,717,338 | 1/1988 | Cellier | 219/469 |
| 4,737,231 | 4/1988 | Seko | 219/469 |

Primary Examiner—Teresa J. Walberg
Attorney, Agent, or Firm—Armstrong, Nikaido, Marmelstein, Kubovcik & Murray

[57] ABSTRACT

A heatable roll, in particular for processing web-like materials, for example paper, which includes a roll body having peripheral passages or bores which are preferably arranged parallel to the axis of the roll body, and at least one, and preferably two, screwed-on flange journals. Heating elements are arranged in the bores which extend in the axial direction parallel to the roll body.

7 Claims, 2 Drawing Sheets

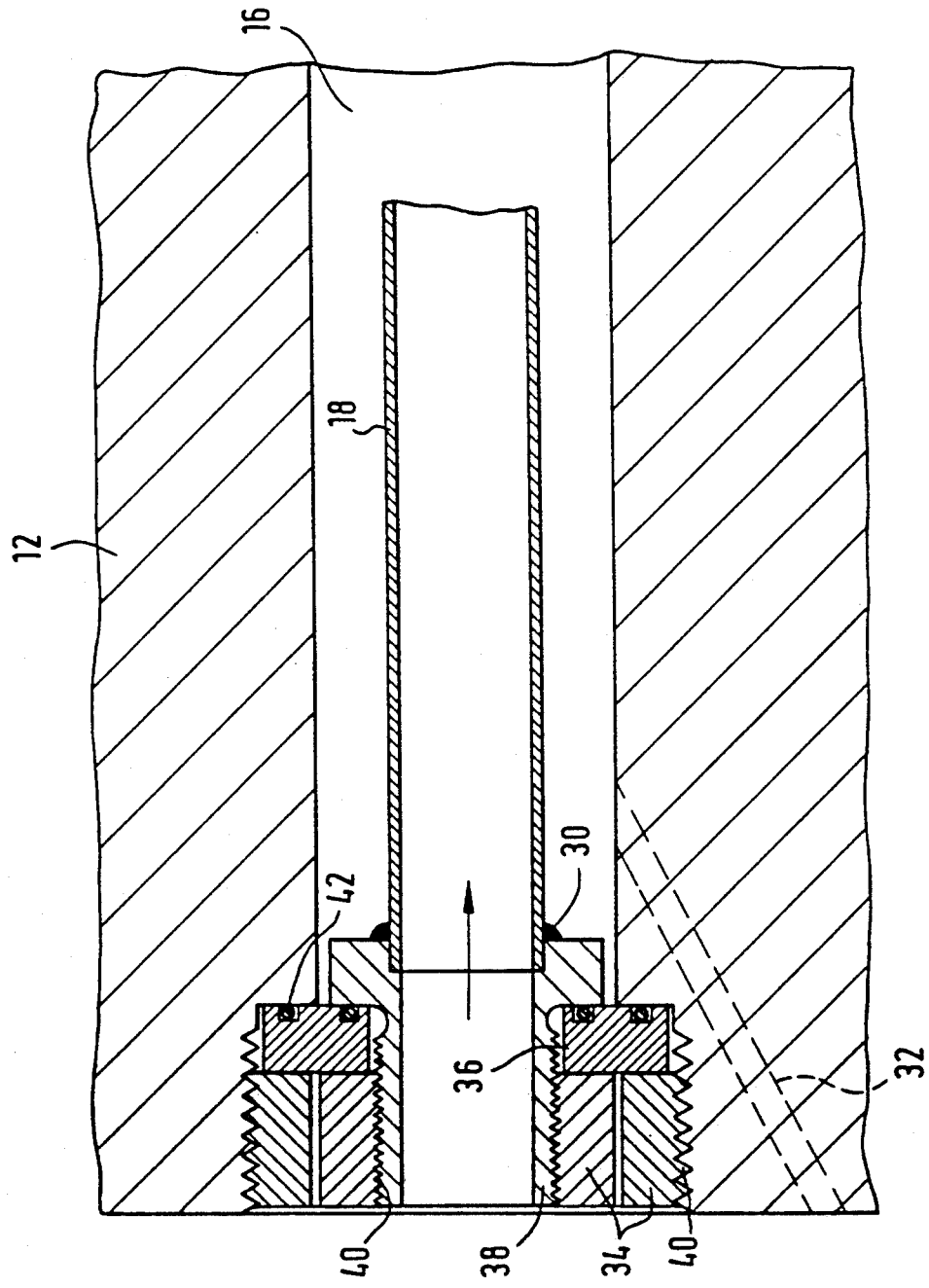

ROLL HAVING HEATING MEANS

BACKGROUND OF THE INVENTION

1. Field of the Invention

The invention relates to a heatable roll, in particular for processing web-like materials, such as paper.

2. Description of the Prior Art

For the processing of web-like materials, such as paper, rolls are known which can be heated from the inside. In a conventional constructional form a heated liquid heat carrier flows through passages or bores which are formed closely beneath the roll surface. The heat carrier thereby gives its thermal energy at least partially up to the bore wall and thus to the roll wall. The roll wall transfers the thermal energy to the web-like material to be processed, for example to dry it.

In this known constructional form for a heatable roll an external means is necessary for heating the heat carrier liquid and keeping it at a predetermined temperature. In many countries, for example Sweden, containers of cast iron are not allowed for closed heat carrier circuits with temperatures above 140° C. Consequently, chilled rolls cannot be heated to temperatures above the specified maximum temperature. On the other hand, high temperatures are desired in the treatment of web-like materials. It is for example perfectly usual in Germany to employ roll temperatures of 200° C. and more.

Furthermore, heatable rolls are known in which the roll jacket rotates about a stationary core. The stationary core is equipped with one or more induction coils. In operation, via the induction coils eddy currents are induced in the rotating roll jacket which heat up the latter by ohmic heat.

Such a constructional form of a heatable roll has the disadvantage that it is extremely sensitive because in a practical embodiment, for example for use in a paper calender, a roll tube has to be supported in cantilever manner over a span of over 8 m above a coil core of the same length. Shocks, which cannot be avoided in practical operation of paper machine glazing rollers, and unbalances, which as a rule occur to varying extents in heatable rolls, necessarily lead to vibrations which result in contacts between rotating and stationary parts. This leads necessarily to damage of the parts concerned. Premature wear or even total breakdown would be the result.

Finally, it should be mentioned that heatable chilled rolls having an external supply of heat carrier liquid come under further safety regulations in countries such as Sweden with regard to the volume content of heat carrier liquid. These safety regulations are intended to reduce the danger originating from the escaping heat carrier liquid on breakage of such rolls.

SUMMARY OF THE INVENTION

The invention therefore has as its object the elimination of the disadvantages of the prior art and in particular the provision of a heatable roll which has high safety and great reliability.

This object is achieved in a heatable roll, in particular for processing web-like material, for example paper, comprising a roll body having peripheral passages or bores which are formed preferably parallel to the axis of the roll body and at least one, as a rule two, preferably screwed-on journal pins, by the improvement that in the bores heating elements are arranged which extend in the axial direction parallel to the roll body.

Further expedient developments are defined by the features of the subsidiary claims.

According to the invention, into the peripheral bores in the roll body of a heatable roll rod-like heating elements are inserted which extend in the same direction as the bores, i.e. parallel to the axis of the roll body.

If these heating elements are expediently formed as electrical resistance heating elements it is possible to dispense with sealing heads on the journals, since now no heat carrier liquid is introduced into the roll or need be removed therefrom and supplied to an external heating means.

In this embodiment the necessary electrical heating energy is supplied for example via wiper contacts to one of the two journals of the heatable roll. Via a line system within the roll body the electrical current is then supplied to the electrical resistance heating elements. The transfer of the thermal energy from the resistance heating element to the roll is by convection by means of suitable convection liquid, for example water. This embodiment has the advantage that only a relatively small amount of convection liquid is required, that is only the amount which is sealingly enclosed in the usually sealed peripheral bores or passages near the roll surface.

In a further extremely expedient embodiment in the peripheral axial parallel bores tubes, as a rule steel tubes, are inserted through which the heat carrier liquid is supplied, as it were separately from the material of the chilled roll. Adequate thermal contact between the introduced tube and the material of the chilled roll can also be implemented by the filling of the intermediate space between tube and bore with a convection liquid.

This embodiment has the advantage that the aforementioned safety regulations do not apply to such rolls and consequently need not be taken into account therefor.

The volume of the convection liquid in the individual peripheral bores separate from each other is as a rule so low that in spite of the pressures to be expected no approval problems are likely to be encountered.

This embodiment consequently has the advantage that it is possible to use a heat carrier to be externally heated and nevertheless temperatures above 140° C. in countries with strict safety regulations because the heat carrier liquid in this case does not have any direct contact with the chilled cast material of the heatable roll but as a rule is guided solely in a system of steel tubes.

Due to the peripheral passages formed near the surface in which the heating elements are arranged, the heat source is close to the location where the heat requirement occurs. Temperature gradients due to long transport paths thus hardly occur. The principle of electrical resistance heating is very simple and robust so that disturbances in operation are hardly to be expected. By the filling with convection liquid the temperature of the heating elements is kept far below the usual temperatures for resistance heating elements so that the life of the heating elements is practically unlimited.

In a further advantageous embodiment the space between the heating tube and bore is filled only partially with a boilable convection liquid, for example water, and otherwise evacuated.

Since the heat exchange does not take place directly between the heating elements and the roll wall but via the convection liquid, it is ensured that the temperature distribution in the axial direction is very uniform Condensation of water vapour in such a system will take place where the temperature is lowest. Consequently, the heat supply takes place automatically exactly at the point which has the greatest heat requirement or the temperature of which has the greatest difference from other points. The amount of condensate is regulated in the same manner, i.e. the greater the temperature difference to a specific region the greater the amount of condensate will be there. In this manner an extremely balanced surface temperature of the roll is achieved although the safety and reliability are nevertheless the main aims.

Expediently, for the temperature regulation near the surface of the roll jacket at least one temperature sensor is provided. Via a conventional control circuit in this manner rapid reaction to temperature deviations can be achieved.

BRIEF DESCRIPTION OF THE DRAWINGS

The invention will be explained in detail hereinafter with reference to preferred embodiments with the aid of the attached drawings, making further advantages and features of the invention apparent. In the drawings:

FIG. 1 is a longitudinal section through a preferred embodiment of the heatable roll according to the invention and FIG. 2 is a fragment of a longitudinal section through a further preferred embodiment of a heatable roll according to the invention.

DESCRIPTION OF THE PREFERRED EMBODIMENTS

Figure 1:
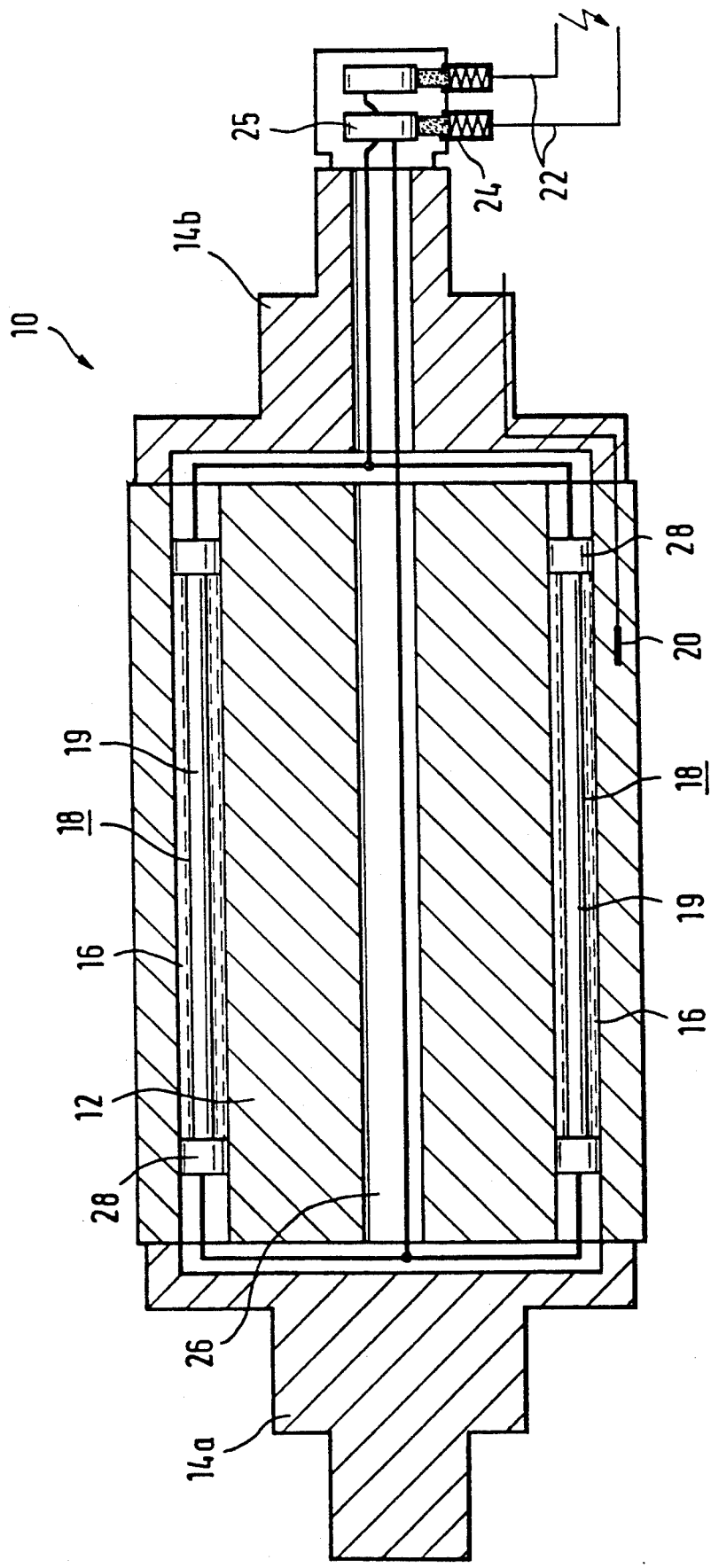

In FIG. 1 a heatable roll according to the invention is denoted generally by the reference numeral 10. Said roll 10 comprises a roll body 12, at the ends of which flanges or journals 14a, 14b are attached. As a rule, such journals 14a, 14b are screwed on with bolts or the like. Via the journal 14b, which is located and guided in a roll bearing, not illustrated here, via leads 22 and via wiper contacts 24 and current pickups 25 electrical energy is introduced into the roll body 12. The journal 14a is used both for guiding in the roll bearing and for the drive for the rotational movement of the roll 10.

Peripheral axial parallel bores 16 formed near the roll surface are provided with heating means 18 which in the present case are electrical resistance heating elements 18.

At the respective ends of the heating elements 18 seals 28 are disposed which enclose the liquids used for the heating in sealing manner. As a rule the seals 28 are provided as close as possible to the respective ends of the roll body 12 in order to achieve a uniform heating effect over the entire roll body 12. In the space between the heating elements 18 and the bore wall of the bore 16 the convection liquid is disposed. It is for example water. The intermediate space between the tube 19 and the wall of the bore 16 is as a rule filled to the greater part with water.

The resistance values of the electrical resistance heating elements 18 are adapted to the necessary heating power and life considerations.

A bore 26 disposed centrally in the roll body 12 serves for the supply and carrying away of the electrical supply current.

At least one temperature sensor 20 is provided near the surface of the heatable roll 10.

In FIG. 2 a further preferred embodiment of the roll 10 according to the invention can be seen. The cutout illustrated is disposed at one end of the roll body 12.

In this embodiment a heat carrier (for example thermo-oil) is heated externally of the roll and introduced into the roll 10 via a rotating sealing head at one of the flanges 14a or 14b. Within the roll body 12 the heat carrier is conducted through tubes, as a rule steel tubes, which are mounted sealingly in the peripheral bores 16. The heated thermal carrier liquid is conducted in the tubes 18 and via the wall of the tube 18 gives its thermal energy up to a convection liquid which is disposed in the sealed intermediate space between the tube 18 and the wall of the peripheral bore 16. The convection liquid usually only partially filling this cavity is preferably water.

The tube 18 is inserted into a flange body 38 which in cooperation with a corresponding flange body 38 on the opposite side of the roll body 12 clamps the tube 18 in the bore 16 and thus holds said tube. A weld seam 30 ensures the sealing of the interior of the tube 18 with respect to the cavity between the tube 18 and the wall of the bore 16. A pressure body 36 provided with seals 42 seals the cavity between the tube 18 and the bore 16 at the end side. The pressure body 36 is applied via one or more nuts 34 with external and internal thread 10 and held in the roll body 12.

For introducing or replenishing the second heat carrier liquid (distilled water) a bore 32 may be provided which leads into the cavity between the tube 18 and the wall of the peripheral bore 16. This additional supply bore 32 must of course be sealingly closable.

Since the heat exchange does not take place directly between the heating elements 18 and the roll body 12 but via the boiling convection liquid, it is ensured that the temperature distribution in the axial direction of the roll body 12 is very uniform. Condensation of water vapour will take place in this system preferably at the point where the temperature at the roll body 12 is lower. Consequently, the heat supply to the roll body 12 takes place automatically at the point exhibiting temperature deviations. In this manner a very balanced surface temperature of the roll 10 according to the invention is achieved.

I claim:

1. A heatable roll, in particular for processing paper and other web-like material, comprising:
   a) a roll body having a plurality of peripheral passages or bores which are formed substantially parallel to the axis of the roll body near the roll surface,
   b) at least one removably attached journal pin, and
   c) rod or tube-like heating elements arranged in said bores or passages and extending in the axial direction parallel to the roll body, wherein
   d) seals are disposed in said bores or passages at the respective ends of the heating elements to form sealed liquid cavities between the heating elements and the walls of the bores or passages, and
   e) said sealed cavities are filled to a greater part with a convection liquid.

2. A heatable roll according to claim 1, wherein the heating elements are rod-like electrical resistance heating elements.

3. A heatable roll according to claim 1 wherein the heating elements are tubes which are traversed by a heat-carrier liquid.

4. A heatable roll according to claim 3, wherein said tubes are steel tubes.

5. A heatable roll according to claim 1 wherein said convection liquid boils at a predetermined heating temperature.

6. A heatable roll according to claim 5, wherein a temperature sensor is provided near the surface of the roll body.

7. A heatable roll according to claim 1, wherein said convection liquid is water.

* * * * *